United States Patent [19]

Dollinger

[11] 4,057,802
[45] Nov. 8, 1977

[54] SIDELOBE CANCELLATION SYSTEM

[75] Inventor: Kenneth Dollinger, Nashua, N.H.

[73] Assignee: Sanders Associates, Inc., Nashua, N.H.

[21] Appl. No.: 757,109

[22] Filed: Jan. 5, 1976

Related U.S. Application Data

[63] Continuation of Ser. No. 612,433, Sept. 11, 1975.

[51] Int. Cl.² ............................................. H04B 7/00
[52] U.S. Cl. ...................... 343/100 LE; 343/100 CL; 325/367; 325/371
[58] Field of Search ................ 343/100 CL, 100 LE; 325/305, 367, 371, 374

[56] References Cited

U.S. PATENT DOCUMENTS

| B 488,395 | 1/1966 | Soule, Jr. et al. | 343/100 LE |
| 3,167,761 | 1/1965 | Parquier | 343/7 |
| 3,588,716 | 6/1971 | Turner et al. | 343/100 LE |
| 3,652,939 | 3/1972 | Levasseur | 325/367 |
| 3,832,711 | 8/1974 | Grant et al. | 343/100 LE |

Primary Examiner—Maynard R. Wilbur
Assistant Examiner—T. M. Blum
Attorney, Agent, or Firm—Louis Etlinger; Richard I. Seligman

[57] ABSTRACT

A sidelobe cancellation system in which the cancellation loop is insensitive to both target and clutter signals is disclosed including a correlator wherein the video inputs thereto are timegated to exclude all but maximum range signals and the gated video is further bandpass filtered to exclude the mainlobe and first sidelobe of the radar video spectrum.

3 Claims, 7 Drawing Figures

SIDELOBE CANCELLATION SYSTEM

This is a continuation of application Ser. No. 612,433, filed Sept. 11, 1975.

BACKGROUND OF THE INVENTION

This invention relates to radar systems and more particularly to a radar receiver adapted to suppress signals from interference sources through sidelobe cancellation.

Sidelobe cancellation is a process by which interfering signals (such as produced by jammers) received through the sidelobes of an antenna are suppressed. One or more omnidirectional antennas for receiving interfering signals are located near the principal antenna which also receives the undesired interfering signal. Optimum amplitude and phase modulations are applied to this signal which is then subtracted from the principal antenna signal. By having the proper phase and amplitude modulation applied, cancellation of the undesirable signals is achieved. The modulation values are derived by correlating the principal antenna output after subtraction of the modulated omnidirectional antenna signals with the omnidirectional antenna signals. These values are applied in a feedback loop such that the cancellation process is continous and automatic. U.S. Pat. No. 3,881,177 is one such system. However, there are drawbacks to the sidelobe cancelling system disclosed in U.S. Pat. No. 3,881,177.

One principal drawback is that system does not provide any means for filtering out radar target signals and clutter either in the frequency domain or time domain. With such means provided the reduction of the canceller response to clutter return can be a significant factor in improving the performance of the system under severe clutter conditions.

The system disclosed in said patent also is unduly inefficient in that it unnecessarily requires additional amplifiers and mixers since it does not utilize the circuitry within the radar receiver itself in the processing. Furthermore, the system disclosed in said patent requires an i.f. translation.

SUMMARY OF THE INVENTION

Accordingly, it is an object of this invention to provide an improved sidelobe cancellation system.

It is another object of this invention to provide a sidelobe cancellation system of improved efficiency.

It is a further object of this invention to provide a sidelobe cancellation system which discriminates against target and clutter signals.

Briefly, a sidelobe cancellation system is provided efficiently by utilizing the radar receiver circuitry to generate the signals applied to the correlator and with director translation to video. Furthermore, the system provides discrimination against target and clutter signals by properly gating and filtering the radar receiver video output signals and reference channel video signals such that correlation between the interference signals received by the main and auxiliary antennas is made substantially independent of target and clutter.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
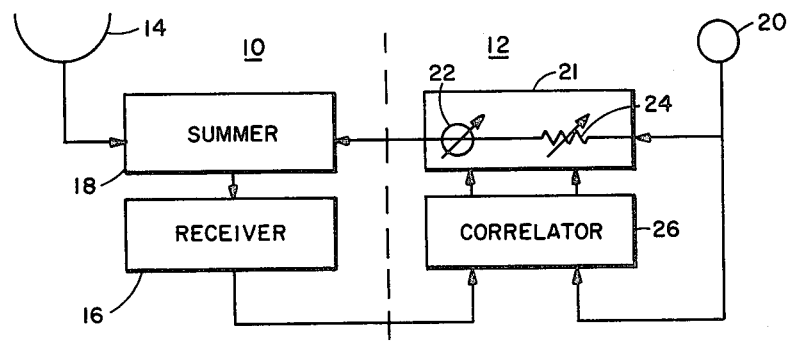
FIG. 1 is a block diagram of a sidelobe cancellation system.

The principle of cancellation of sidelobe jamming energy according to the present invention is shown in the elementary block diagram of FIG. 1 wherein the system is divided into a main channel 10 and a reference channel 12. Conventionally radar signals would be received at a directional antenna 14 and applied to the radar receiver 16. Modification to the conventional radar includes the provision of a summer 18 in the main channel 10 and the addition of reference channel 12.

Reference channel 12 includes an omnidirectional antenna 20, a phase and amplitude controller 21, comprising a phase shifter 22, and an attenuator 24, and a correlator 26. The auxiliary antenna 20 is an omnidirectional reference antenna and provides a sample of the interfering signal. The output from phase and amplitude controller 21 is applied to summer 18 which is also coupled to the directional antenna 14. When correctly phrase and amplitude controlled, the reference channel 12 provides an r.f. signal which is summed with the main signal from antenna 14 to yield an r.f. signal input to receiver 16 in which the interference has been cancelled. The gain of antenna 20 is selected to be approximately that of the highest sidelobe of the main antenna 14. The correlator 26 provides control signal to phase and amplitude controller 21 such that the signal from antenna 22 provides cancellation of the interference in summer 18.

Figure 2:
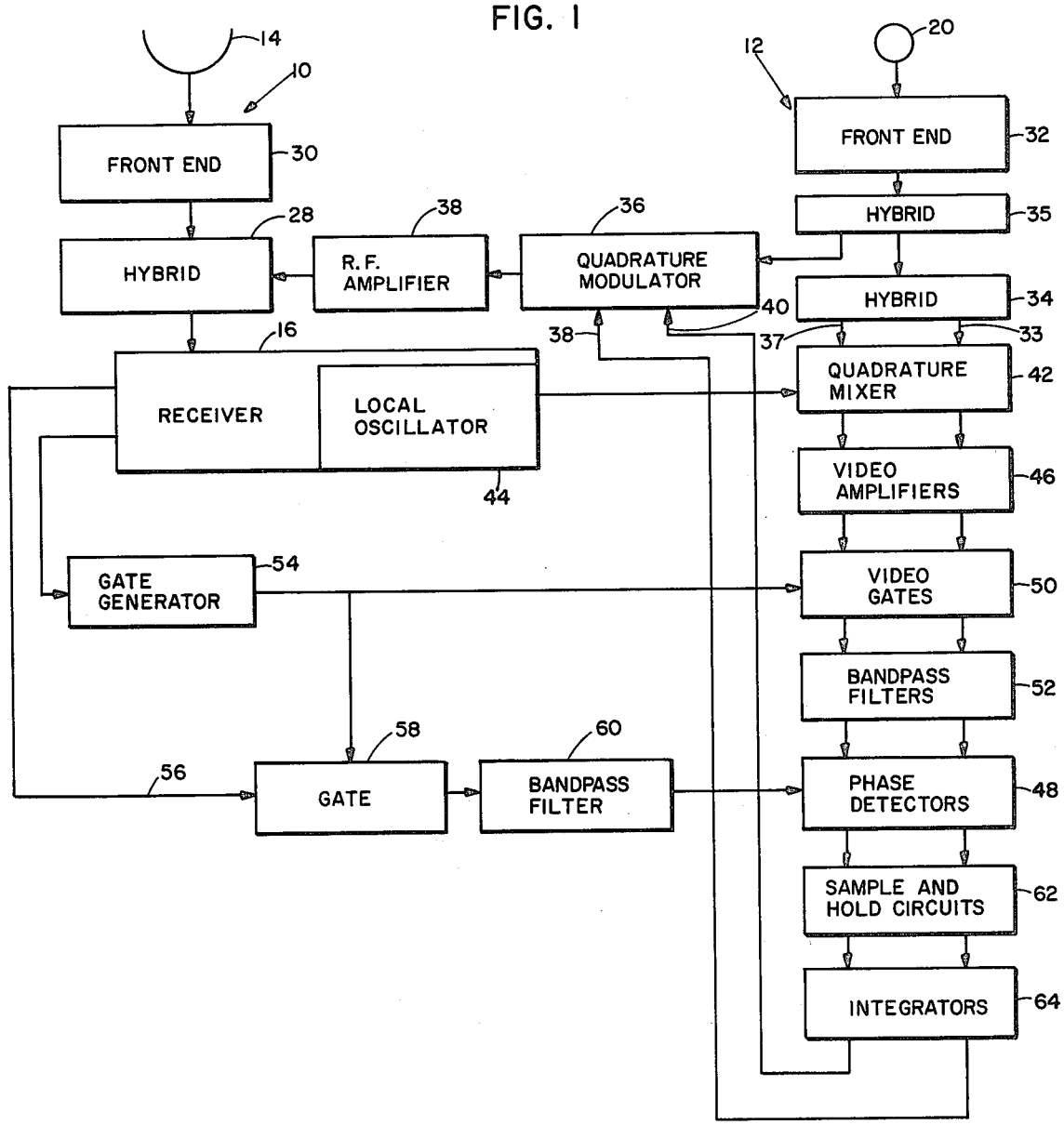
FIG. 2 is a more comprehensive block diagram of a sidelobe cancellation system.

A more comprehensive illustration of the invention is described in conjunction with the system of FIG. 2. In FIG. 2 the input from the main antenna 14 is applied to a hybrid 28 via the conventional front end 30 of a radar system. The output from auxiliary antenna 20 is applied to hybrid 35 through another conventional front end 32 to split the power to a hybrid 34 and a quadrature modulator 36, wherein the phase and amplitude correction is provided, and an r.f. amplifier 38. Hybrid 34 splits the power to a quadrature mixer 42 and to the remainder of the reference channel 12. Any omnidirectional antenna which has a gain of at least that of the highest sidelobe of the main antenna 14 may be employed, as for example, a biconical horn or a pair of crossed dipoles.

In the preferred embodiment the means 36 for providing phase and amplitude control of the reference signal is a quadrature modulator having a pair of control inputs 38 and 40. The output from hybrid 28, wherein the interference signal is cancelled, is applied to receiver 16.

The second outputs 33 and 37 from hybrid 34 are applied to a quadrature mixer 42 along with the output from the radar local oscillator 44. The outputs from quadrature mixer 42 are amplified by a pair of video amplifiers 46 and applied to a pair of phase detectors 48 via a pair of video gates 50 and bandpass filters 52.

Figure 3A:
FIG. 3A is a representative waveform illustrating timegating of the signals in the system of FIG. 2.
Figure 3B:
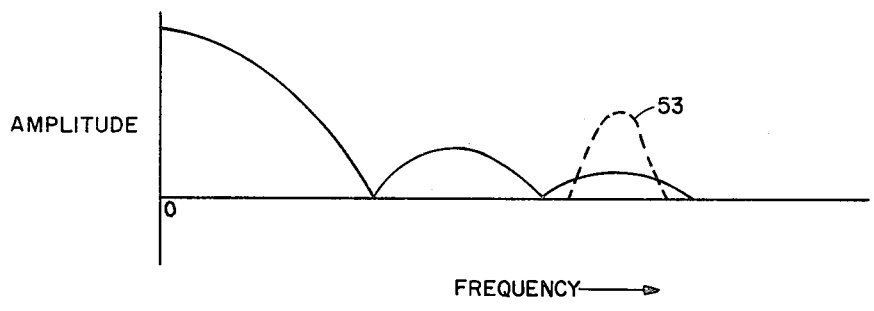
FIG. 3B is a typical radar spectrum illustrating bandpass filtering of the signals in the system of FIG. 2.

The video gates 50 are enabled by a pulse from a gate generator 54 which occurs a predetermined period after the radar main bang at the end of the range interval where target and clutter returns are at a minimum so that minimum target and clutter levels are processed by the reference channel. This is illustraed in FIG. 3A. Gate generator 54 is enabled by an output of the receiver 16 denoting that the radar main bang has occurred and the pulse from the gate generator occurs a predetermined time thereafer. This time gating of the video inputs to the correlator excludes all but maximum range signals which, of course, are very low in amplitude. Bandpass filters 52 pass frequencies outside the principal target and clutter spectrum to again assure that minimum target and clutter are processed by the reference channel. This is illustrated in FIG. 3B wherein the radar video spectrum is shown. A typical bandpass for these filters is shown by curve 53 of FIG. 3B. Since the jammer frequency spectrum will be much broader than the radar frequency spectrum operation at the extreme end of the radar frequency spectrum will not detract from the interference cancelling process. The input to phase detectors 48 is the video input from receiver 16 via input line 56. This input to the phase detectors is also applied via a gate 58 and bandpass filter 60 such that the receiver video signal is similarly gated and bandpass filtered like the reference signal to discriminate against target and clutter. In one reduction to practice of the invention the gates 50 and 58 are closed only during the range interval of 20 to 25 km and kept open during the 0 to 20 km range interval. The bandpass filters 52, 60 have a passband typically from 250 KHz to 270 KHz. In this manner only clutter in a 5 km interval is accepted. Furthermore, clutter filtering is provided by the filter since the pass band of these filters exclude both the mainlobe and first sidelobe of the clutter spectrum.

The output from the phase detectors 48 are applied to the control inputs 38 and 40 of quadrature modulator 36 via sample and hold circuits 62 and integrators 64. The correlator output is the loop control signal which drives quadrature modultor 36.

The action of the loop is to automatically adjust the phase and amplitude of the reference signal which is combined with the radar input to mull the interference. When this occurs, the radar video at the phase detectors 48 no longer contain an interfering signal to correlate against the reference channel, and the correlator output is therefore zero. This type of loop is characterized by a gain function which is proportional to the strength of the interfering signal. The cancellation ratio increases with increasing interference level.

Figure 4:
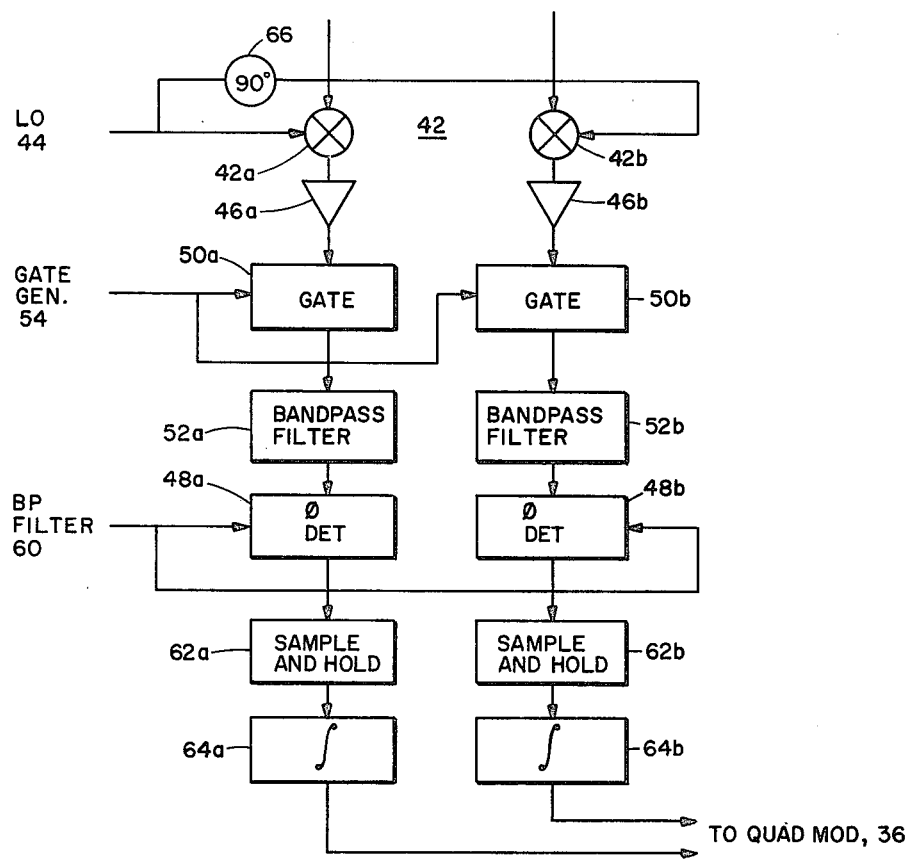
FIG. 4 is a more comprehensive block diagram of the reference channel of the system of FIG. 2.

FIG. 4 illustrates in greater detail the reference chain 12 of FIG. 2. The input signals to the reference chain are applied to quadrature mixture 42 comprising mixers 42a and 42b. Mixer 42a receives at another input thereto a signal from local oscillator 44 while mixer 42b receives an input from the local oscillator 44 via a 90° phase shifter 66. The output of the mixers 42a and 42b are amplified by amplifier 46a and 46b and applied to phase detectors 48a and 48b via gates 50a and 50b and bandpass filters 52a and 52b. The gates 50a and 50b are enabled from an output from gate generator 54.

The other inputs to phase detectors 48a and 48b comes via bandpass filters 60 and is the main channel r.f. signal. The outputs of phase detector 48a and 48b are applied to the quadrature modulator 36 via sample and hold circuits 62a and 62b and integrators 64a and 64b.

Figure 5:
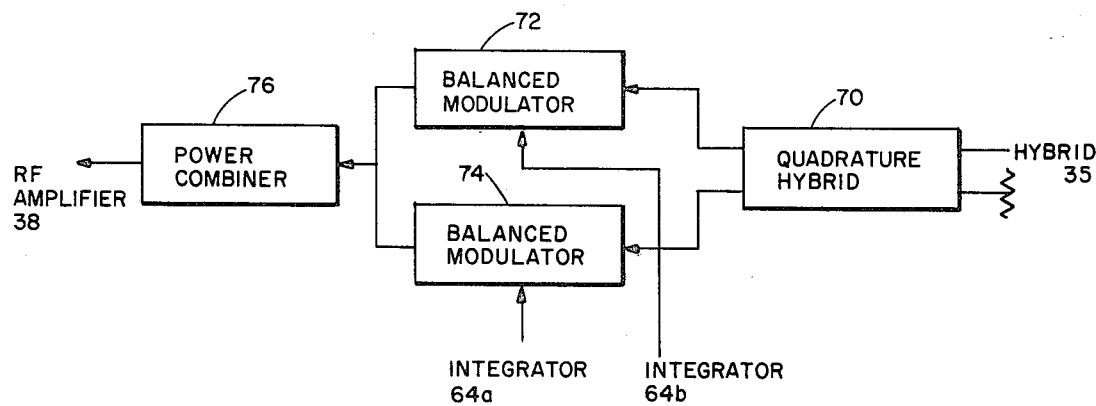
FIG. 5 is a more comprehensive block diagram of the quadrature modulator of the system of FIG. 2.

FIG. 5 is one embodiment of a device for providing the amplitude and phase control as shown in FIG. 1 and is a further elaboration of the quadrature modulator 36 of FIG. 2. Quadrature modulator 36 comprises a quadrature hybrid 70 having one input thereof connected to hybrid 35 of of FIG. 2 or other suitable power divider. The zero and 90° outputs from the quadrature hybrid 70 are applied to a pair of balanced modulators 72 and 74 with the outputs from the balance modulators 72 and 74 combined in a power combiner, as for example, as in phase hybrid 76, the output from which is applied to r.f. amplifier 38 of FIG. 2. The control imputs of balanced modulators 72 and 74 are coupled to the integrator 64a and 64b of FIG. 3. It is a property of the quadrature modulator that by varying the control signals to the control modulators thereof any phase and any amplitude can be achieved.

Figure 6:
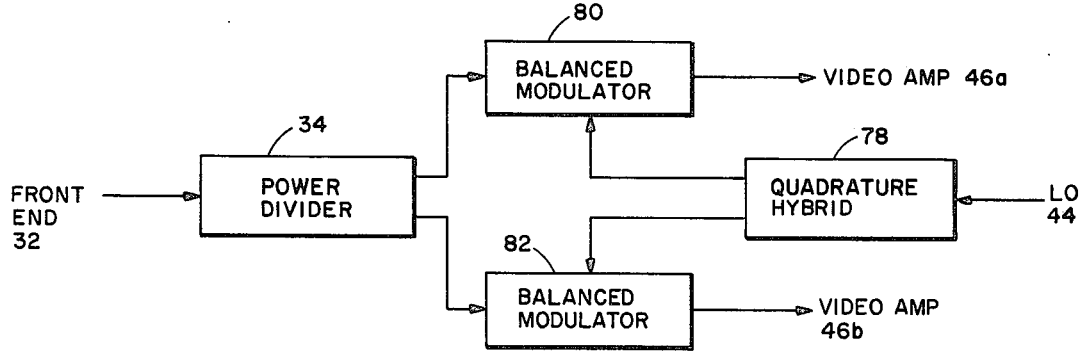
FIG. 6 is a more comprehensive block diagram of the quadrature mixture of the system of FIG. 2.

Referring now to FIG. 6 there is illustrated thereby one preferred embodiment for the quadrature mixer 42 comprising a pair of balance modulators 80 and 82 which receive inputs from power divider or in phase hybrid 34 of FIG. 2. The other input to the balance modulators 80 and 82 are received from a quadrature hybrid 78 the input to which is received from the local oscillator 44. The outputs of the balance modulator 74 and 76 are applied to the video amplifiers 46a and 46b.

While I have described above the principles of my invention in conjunction with specific apparatus, it is to be clearly understood that this description is made only by way of example and not as a limitation of the scope of my invention as set forth in the accompanying claims.

I claim:

1. Apparatus for cancelling sidelobe interference energy, comprising:
   a primary antenna for receiving a signal which may include a desired signal and an interfering signal;
   an auxiliary antenna for receiving a signal including primarily said interfering signal;
   means coupled to said primary antenna for substantially cancelling said interfering signal;
   a correlator coupled to said primary and auxiliary antennas for generating a signal indicative of the difference between the signals applied thereto:
   first bandpass filtering means coupling said primary antenna to said correlator;
   second bandpass filtering means coupling said auxiliary antenna to said correlator;
   said first and second bandpass filtering means having a frequency response such as to exclude at least the main lobe of the radar pulse spectrum of the desired signal; and
   means coupling the outut of said correlator to said cancellation means.

2. Apparatus as defined in claim 1, further including means coupling said antennas and said correlator for timegating the signals applied to said correlator to exclude all but maximum range signals.

3. Apparatus as defined in claim 1 wherein the desired signal is a pulsed signal, said first and second bandpass filtering means having a frequency reponse such as to substantially exclude the main-lobe and first sidelobe of the pulse spectrum.

* * * * *